US011098902B2

(12) United States Patent
Raboine

(10) Patent No.: US 11,098,902 B2
(45) Date of Patent: *Aug. 24, 2021

(54) MODULAR BRICK OR BLOCK OUTDOOR STRUCTURES

(71) Applicant: OLDCASTLE APG SOUTH, INC., Atlanta, GA (US)

(72) Inventor: Joseph P. Raboine, Burlington, WI (US)

(73) Assignee: OLDCASTLE APG SOUTH, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,315

(22) Filed: Jun. 28, 2018

(65) Prior Publication Data

US 2018/0306447 A1 Oct. 25, 2018

Related U.S. Application Data

(60) Continuation of application No. 15/147,558, filed on May 5, 2016, now Pat. No. 10,030,873, which is a
(Continued)

(51) Int. Cl.
*F24B 1/181* (2006.01)
*A47J 37/07* (2006.01)
(Continued)

(52) U.S. Cl.
CPC ........... *F24B 1/181* (2013.01); *A47J 37/0759* (2013.01); *E04B 1/34331* (2013.01); *E04B 1/34336* (2013.01); *E04H 1/1205* (2013.01);

*F24B 1/182* (2013.01); *F24B 1/1806* (2013.01); *F24B 1/191* (2013.01); *F24B 1/195* (2013.01); *A47J 37/0704* (2013.01)

(58) Field of Classification Search
CPC ........ F24B 1/181; F24B 1/195; F24B 1/1806; F24B 1/191; F24B 1/182; E04B 1/34331; E04B 1/34336; A47J 37/0759; A47J 37/0704; E04H 1/1205
See application file for complete search history.

(56) References Cited

U.S. PATENT DOCUMENTS 2,499,156 A 2/1950 Paolella
D158,949 S 6/1950 Ferrin
(Continued)

FOREIGN PATENT DOCUMENTS

WO WO-2006119581 A8 * 1/2008 ............. B65D 19/38

*Primary Examiner* — Basil S Katcheves
*Assistant Examiner* — Omar F Hijaz
(74) *Attorney, Agent, or Firm* — Merchant & Gould P.C.

(57) ABSTRACT

A modular brick or block outdoor structure includes an outdoor structure that is constructed in modular sections. Each modular section is fabricated from a plurality of paving bricks or retaining wall blocks that match the brick or block used to construct the patio. The bricks or blocks are preferably assembled to each other with adhesive. Each modular section includes means for transporting thereof with some type of equipment, if necessary. It is preferable that each modular section include channels to receive lifting forks of an end loader or other suitable transport device, if necessary. However, other methods of transporting the modular section may also be used.

14 Claims, 14 Drawing Sheets

Related U.S. Application Data continuation of application No. 14/682,867, filed on Apr. 9, 2015, now Pat. No. 9,383,109, which is a division of application No. 13/208,841, filed on Aug. 12, 2011, now abandoned, which is a division of application No. 11/737,208, filed on Apr. 19, 2007, now Pat. No. 8,931,218.

(51) Int. Cl.

| | | |
|---|---|---|
| *E04B 1/343* | (2006.01) | |
| *F24B 1/182* | (2006.01) | |
| *F24B 1/191* | (2006.01) | |
| *E04H 1/12* | (2006.01) | |
| *F24B 1/18* | (2006.01) | |
| *F24B 1/195* | (2006.01) | |

(56) References Cited

U.S. PATENT DOCUMENTS

| | | | | |
|---|---|---|---|---|
| 3,289,666 | A * | 12/1966 | Prather | F24B 1/18 126/500 |
| 3,302,593 | A * | 2/1967 | Roberts | B65D 19/0069 108/51.3 |
| 3,344,737 | A * | 10/1967 | Sanders | A47J 37/06 126/8 |
| 3,344,917 | A * | 10/1967 | Raffet | B65D 71/02 206/451 |
| 3,467,032 | A * | 9/1969 | Charterton | B65D 19/0012 108/57.26 |
| 3,596,427 | A * | 8/1971 | Fernandez | E04B 2/78 248/357 |
| 3,695,426 | A * | 10/1972 | Engelsberger | B65D 71/0088 206/497 |
| 3,874,364 | A | 4/1975 | Fauser | |
| 4,010,581 | A * | 3/1977 | Keturi | E04B 1/04 52/220.2 |
| 4,182,089 | A * | 1/1980 | Cook | E04B 2/46 52/284 |
| 4,254,867 | A * | 3/1981 | Capozziello | B65D 71/0096 206/322 |
| 4,422,438 | A * | 12/1983 | Scholz | F24B 1/18 126/500 |
| 4,478,208 | A | 10/1984 | Pitha | |
| 4,517,956 | A | 5/1985 | Baker | |
| 4,996,973 | A | 3/1991 | Sigvardsson | |
| 5,076,175 | A * | 12/1991 | Whatley, II | B65D 19/38 108/51.11 |
| 5,184,558 | A * | 2/1993 | Wozniacki | B65D 19/0028 108/51.3 |
| 5,192,123 | A * | 3/1993 | Wallin | A47B 96/00 248/500 |
| 5,267,421 | A * | 12/1993 | Salisbury | E06B 3/685 52/314 |
| 5,329,861 | A * | 7/1994 | McCarthy | B65D 19/0026 108/51.3 |
| 5,333,601 | A * | 8/1994 | Hill | F24B 5/02 126/500 |
| 5,402,609 | A * | 4/1995 | Kelley, Jr. | B28B 7/183 52/122.1 |
| 5,546,710 | A * | 8/1996 | Barry | E04H 13/003 52/104 |
| 5,771,645 | A * | 6/1998 | Porter | E04C 2/243 29/897 |
| 5,788,423 | A | 8/1998 | Perkins | |
| 6,109,257 | A * | 8/2000 | Hodge | F24B 1/18 126/500 |
| D439,316 | S | 3/2001 | Coleman | |
| 6,374,822 | B1 * | 4/2002 | Lyons | F23M 5/00 126/500 |
| 6,679,656 | B1 * | 1/2004 | Manthei | E02D 29/0241 403/347 |
| 6,796,098 | B2 * | 9/2004 | Hampton | B28B 7/0044 52/603 |
| 6,835,343 | B2 * | 12/2004 | Manthei | E02D 29/025 249/142 |
| 6,863,468 | B2 * | 3/2005 | Davis | E01F 15/088 404/6 |
| 6,923,172 | B2 * | 8/2005 | Muldoon | A47J 37/0704 126/25 R |
| 7,140,364 | B1 * | 11/2006 | Buffington | F24B 1/18 126/500 |
| 7,144,188 | B1 * | 12/2006 | Mallinson | E01F 15/086 404/6 |
| 7,553,109 | B2 * | 6/2009 | Blundell | E02D 29/0266 249/101 |
| 7,581,361 | B1 * | 9/2009 | Murkland | E04B 1/72 220/800 |
| 8,931,218 | B2 | 1/2015 | Raboine | |
| 9,383,109 | B2 | 7/2016 | Raboine | |
| 2001/0019684 | A1 * | 9/2001 | Manthei | E02D 29/025 405/284 |
| 2002/0152709 | A1 | 10/2002 | Gresser | |
| 2004/0065313 | A1 | 4/2004 | Thompson | |
| 2005/0201828 | A1 * | 9/2005 | Kang | E01F 15/086 404/6 |
| 2006/0037267 | A1 * | 2/2006 | Taylor, Jr. | B28D 1/00 52/415 |
| 2006/0102517 | A1 * | 5/2006 | Chen | B65D 19/06 206/600 |
| 2007/0238166 | A1 * | 10/2007 | McNelly | B65D 88/121 435/290.1 |
| 2009/0193857 | A1 | 8/2009 | Bearzot et al. | |
| 2010/0251632 | A1 * | 10/2010 | Chen | B28B 3/26 52/95 |
| 2013/0263841 | A1 * | 10/2013 | Terpstra | A47J 37/0759 126/25 R |

* cited by examiner

MODULAR BRICK OR BLOCK OUTDOOR STRUCTURES

CROSS REFERENCE TO RELATED APPLICATIONS

This application is a continuation application of U.S. patent application Ser. No. 15/147,558 filed on May 5, 2016, which is a continuation of U.S. patent application Ser. No. 14/682,867 filed on Apr. 9, 2015, now U.S. Pat. No. 9,383, 109, which is a divisional of U.S. patent application Ser. No. 13/208,841 filed on Aug. 12, 2011, now abandoned, which is a divisional of U.S. patent application Ser. No. 11/737,208 filed on Apr. 19, 2007, now U.S. Pat. No. 8,931,218, the contents of which are incorporated herein by reference in its entirety.

BACKGROUND OF THE INVENTION

1. Field of the Invention

The present invention relates generally to patio accessories and more specifically to a modular brick or block outdoor structure, which is pre-constructed at one site and installed at a second site using laborers with minimal labor skills.

2. Discussion of the Prior Art

Patio installers usually employ laborers with minimal labor skills. The laborers are not capable of doing masonry work to construct fire places, fire pits and kitchens out of stone or masonry block. Further, building fire places, fire pits and kitchens on a patio from single blocks or bricks is very costly and time consuming. Finally, most outdoor structures are constructed of materials that do not match the paving brick or retaining wall block used to construct a patio.

U.S. Pat. No. 4,996,973 to Sigvardsson discloses a stove well as a method and a device for manufacturing and mounting fire-places. The Sigvardsson patent includes a method for manufacture and mounting of fireplaces, e.g. stoves, a lower and an upper half of the fire-place manufactured separately and transported to the mounting place.

Patent application publication no. 2004/0065313 to Thompson discloses a modular outdoor kitchen. The Thompson patent application includes a modular outdoor kitchen comprising a plurality of weather-resistant outdoor kitchen modules. Each module comprises a frame having a plurality of outer faces. A plurality of weather-resistant facia panels are provided on at least a portion of the pluralities of outer faces of the frames.

U.S. Pat. No. 7,140,364 to Buffington discloses a prefabricated modular lightweight fireplace. The Buffington patent discloses a firebox that is pre-cast in modular sections of lightweight vermiculate concrete.

Accordingly, there is a clearly felt need in the art for a modular brick or block outdoor structure, which is pre-constructed at one site and installed at a second site using laborers with minimal labor skills and which reduces the cost of constructing an outdoor structure at the second site from single bricks or blocks.

SUMMARY OF THE INVENTION

The present invention provides a modular brick or block outdoor structure, which reduces the cost of constructing an outdoor structure at a second site from single bricks or blocks. The modular brick or block outdoor structure includes an outdoor structure that is constructed in modular sections. Each modular section is fabricated from a plurality of paving bricks or retaining wall blocks that match the brick or block used to construct the patio. The plurality of bricks or blocks are preferably assembled to each other with adhesive. Each modular section includes means for transporting thereof with some type of equipment. It is preferable that each modular section include channels to receive lifting forks of an end loader or any other suitable transport device. However, other methods of transporting the modular section may also be used.

Accordingly, it is an object of the present invention to provide a modular brick or block outdoor structure, which is pre-constructed at one site and installed at a second site using laborers with minimal labor skills.

It is a further object of the present invention to provide a modular brick or block outdoor structure, which reduces the cost of constructing an outdoor structure at a second site from single bricks or blocks.

Finally, it is another object of the present invention to provide a modular brick or block outdoor structure, which includes paving brick or retaining wall block that matches the paving brick or retaining wall block of the patio that thereof is installed on.

These and additional objects, advantages, features and benefits of the present invention will become apparent from the following specification.

DETAILED DESCRIPTION OF THE PREFERRED EMBODIMENTS

Figure 1:
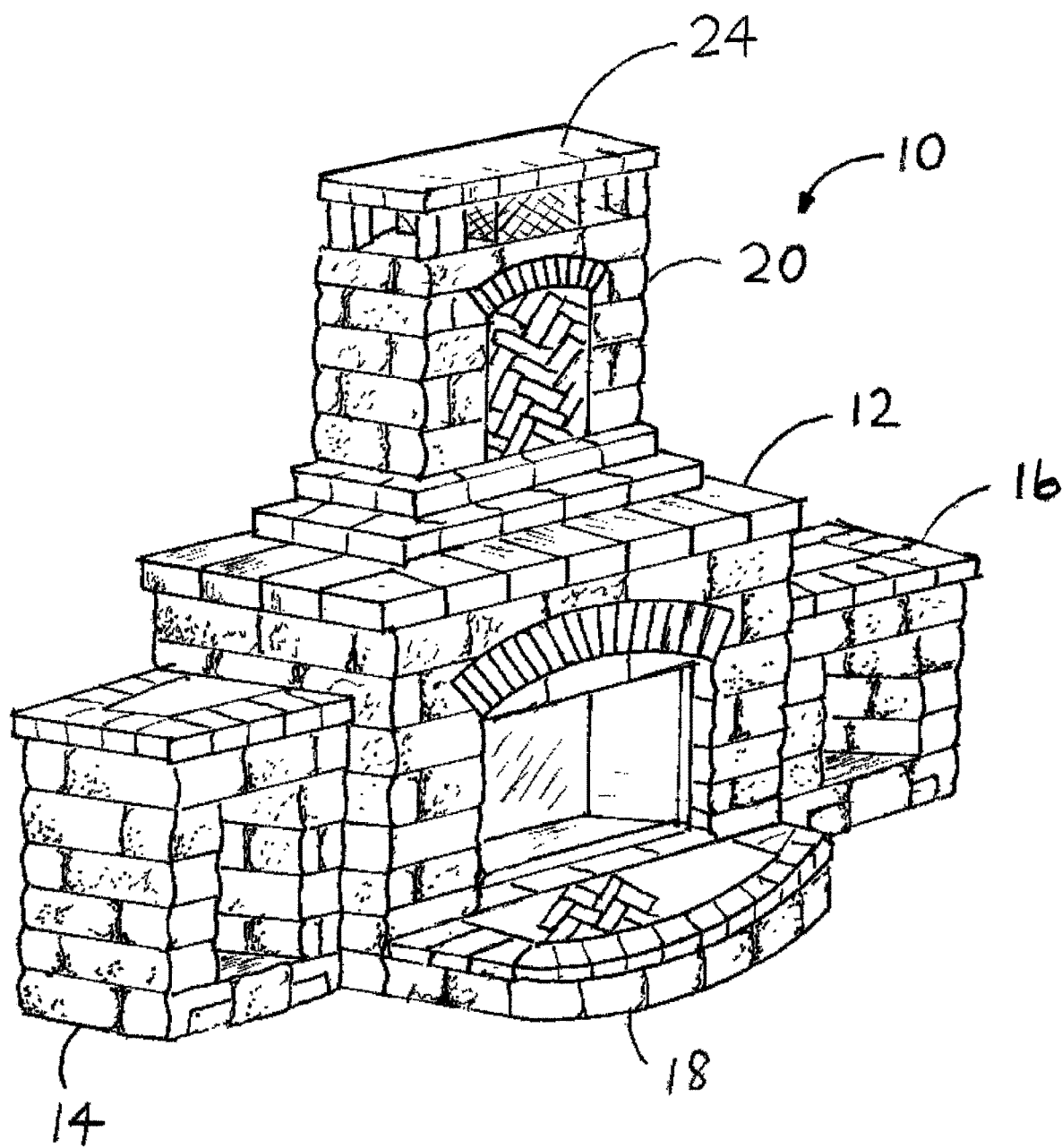
FIG. 1 is a perspective view of a modular brick or block outdoor fireplace in accordance with the present invention.
Figure 2:
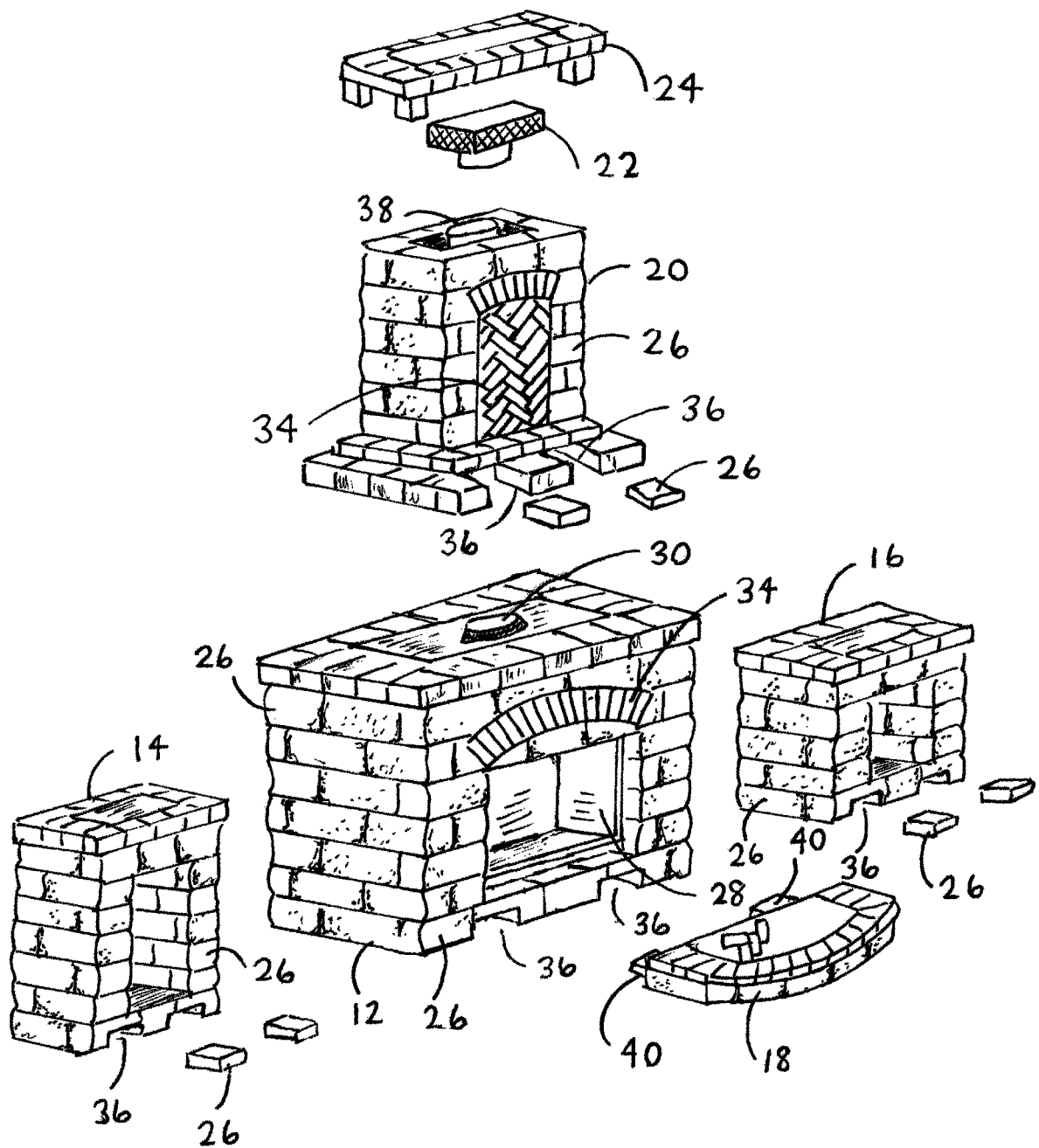
FIG. 2 is an exploded perspective view of a modular brick or block outdoor fireplace in accordance with the present invention.

With reference now to the drawings, and particularly to FIG. 1, there is shown a perspective view of a modular brick or block outdoor fireplace (outdoor fireplace) 10. With reference to FIG. 2, the outdoor fireplace 10 preferably includes a base fireplace section 12, a first wood storage box 14, a second wood storage box 16, a hearth section 18, a chimney section 20, a termination flue cap 22 and a decorative cap 24. The base fireplace section 12 includes a plurality of brick or block 26, a fire box 28 and a flue flange 30. The brick or block 26 is either paving brick or retaining wall block that matches the brick or block used to construct a patio, where the fireplace 10 is placed.

Figure 5:
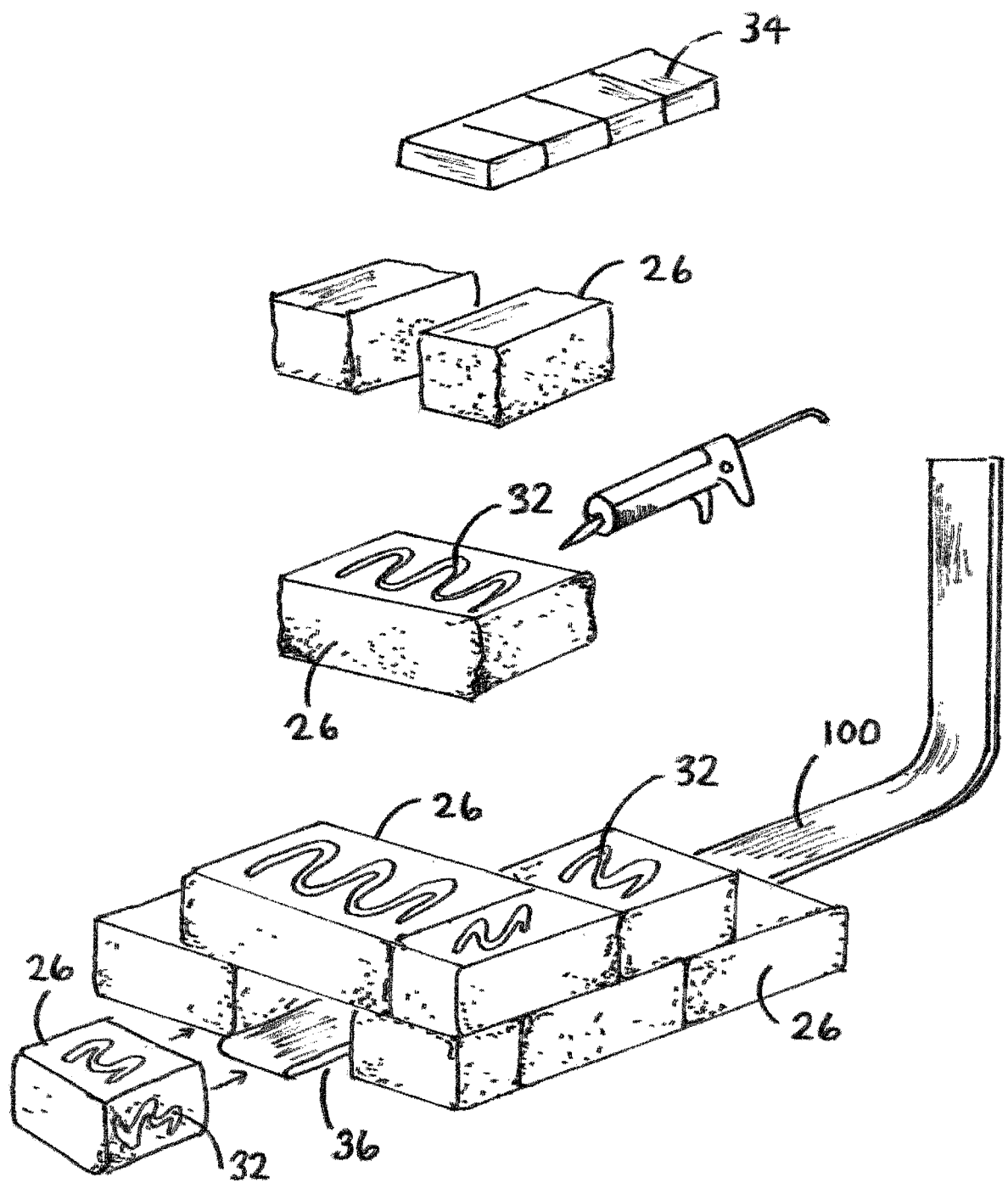
FIG. 5 is a perspective view of a plurality of brick or block being assembled to create an outdoor structure with a channel to receive a lifting fork in accordance with the present invention.

With reference to FIG. 5, the brick or block 26 is secured to each other with adhesive 32. Other types of brick 34 may also be used to create a modular section besides the brick or block 26. Two channels 36 are created in a bottom of the base fireplace section 12 by assembly of the brick or block 26 in a particular pattern. The channel 36 is sized to slidably receive a lift fork 100. The lift fork 100 of an end loader or the like is used to transfer the modular section from a truck to a patio.

When the modular section is set in-place; a single brick or block 26 with adhesive 32 is applied thereto and inserted into the channel 36 to cosmetically remove the channel 36. The brick or block 26 is assembled around the fire box 28 to create the outdoor fireplace 10 preferably by a manufacturer at a first site and shipped to a second site, such as a patio. Fire boxes are well known in the art and need not be explained in detail. The flue flange 30 extends above the fire box 28 to receive the flue pipe 38. The flue flange 30 receives the exhaust of the fire box 28.

The first and second wood storage boxes include a plurality of brick or block 26 assembled with adhesive 32. Two channels 36 are formed in a bottom of the first and second wood storage boxes to receive two lift forks 100. A hearth section 18 includes a plurality of brick or block 26 assembled with adhesive 32. Two channel projections 40 extend from a rear of the hearth section 18. The two channel projections 40 are sized to be received by the two channels 36 in the fireplace base section 12. The hearth section 18 may be moved by a couple of laborers. The chimney section 20 includes a plurality of brick or block 26 assembled with adhesive 32. Two channels 36 are formed on a bottom of the chimney section 20. The flue pipe 38 extends through a center of the chimney section 20. A termination flue cap 22 is secured to an end of the flue pipe 38. The decorative cap 24 includes either brick or block 26 or other types of brick 34, which area assembled with adhesive 32. The decorative cap 24 may be moved by one or two laborers.

Figure 3:
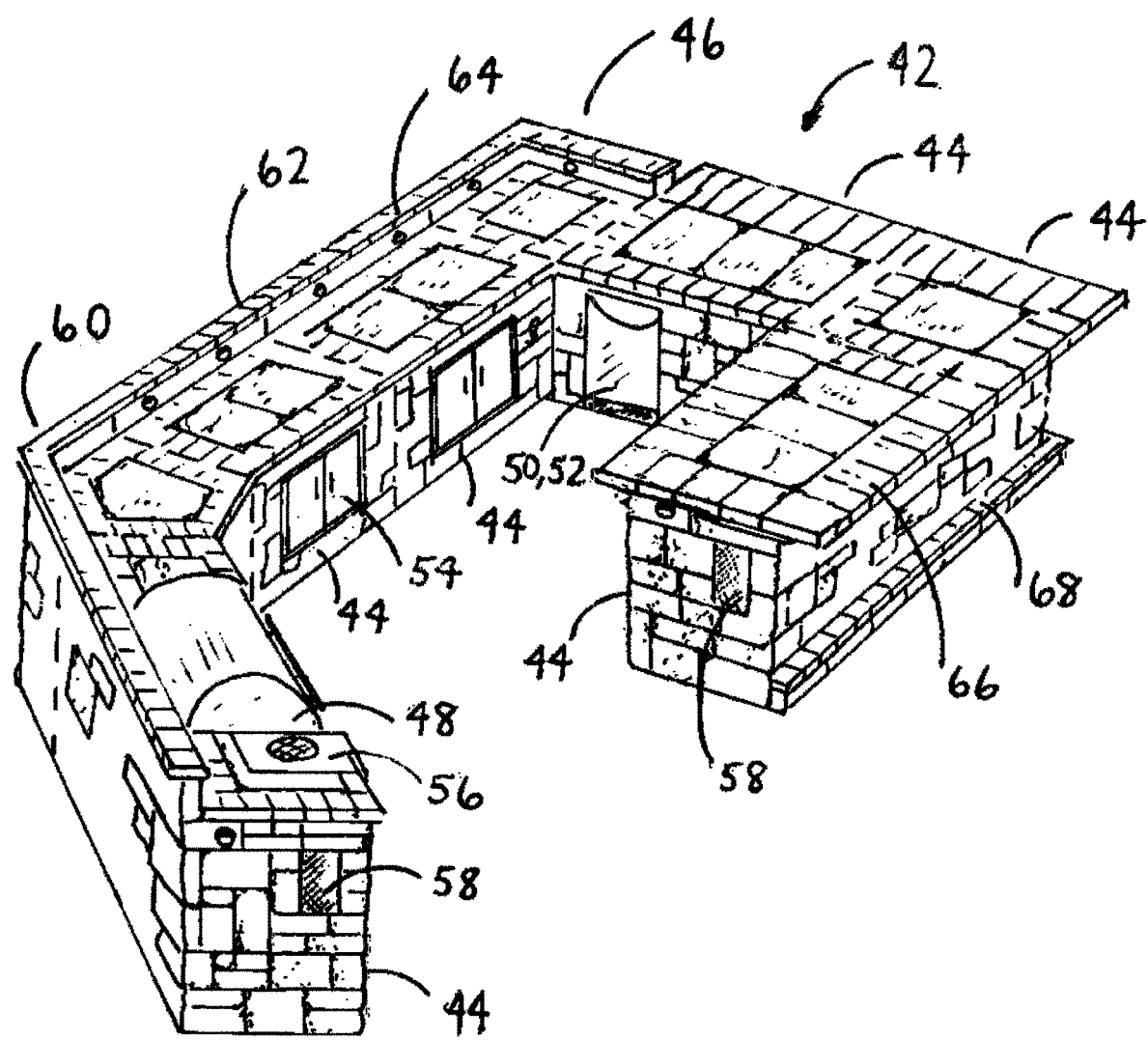
FIG. 3 is a perspective view of a modular brick or block outdoor kitchen in accordance with the present invention.

With reference to FIG. 3, a modular brick or block outdoor kitchen (outdoor kitchen) 42 includes at least one base unit 44. A first base unit 44 would be placed adjacent to one side of a corner unit 46 and a second base unit 44 would be placed adjacent to a perpendicular side of the corner unit 46. Essentially, each base unit 44 includes a kitchen component and a plurality of brick or block 26 built around the kitchen component. The kitchen components include a grill 48, a refrigerator 50, a dishwasher 52, a cabinet 54, a burner 56, an audio speaker 58 and the like. A forty five degree corner unit 60 may also be used instead of the corner unit 46. However, other angles besides 45 and 90 may also be used.

A back splash 62 and/or lights 64 may be formed on a top of the base unit 44 and/or the corner unit 46, 60. Alternatively, a bar top 66 may be formed on a top of the base unit 44 and/or the corner unit 46, 60. The bar top 66 extends over at least one side of the base unit 44 and/or the corner unit 46, 60. A foot rail 68 may be formed at a bottom of the base unit 44 and/or the corner unit 46, 60.

Figure 4:
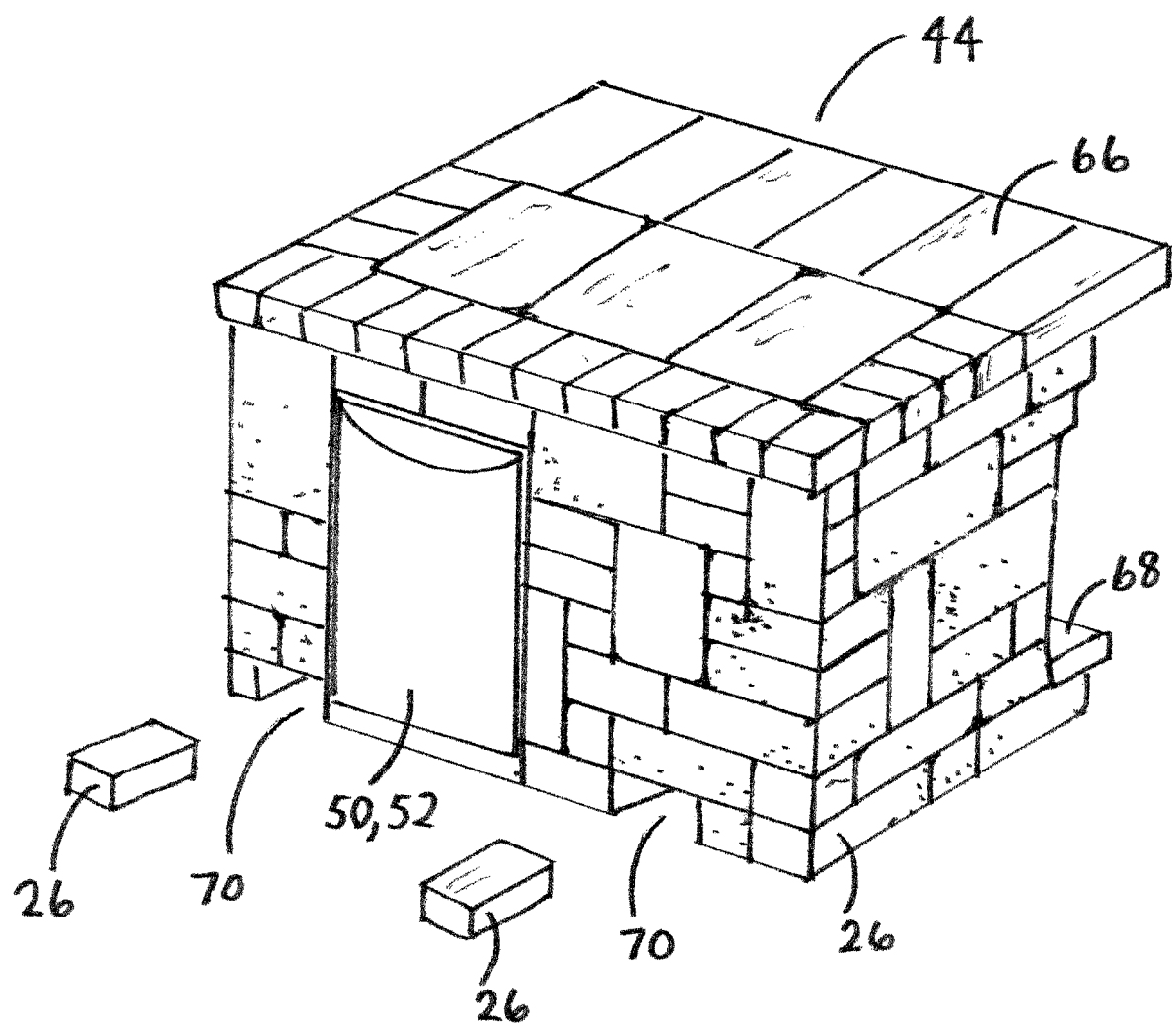
FIG. 4 is a perspective view of a refrigerator or dishwasher retained in a base unit of a modular brick or block outdoor kitchen in accordance with the present invention.

With reference to FIG. 4, the base unit 44 includes the refrigerator 50 or the dishwasher 52; a plurality of brick or block 26; the bar top 66; and the foot rail 68. The plurality of brick or block 26 is built around the refrigerator 50 or the dishwasher 52. Two channels 70 are formed in a bottom of the base unit 44 to receive two lift forks 100. A single brick 26 is inserted into each channel 70 to hide thereof for cosmetic purposes.

Figure 6A:
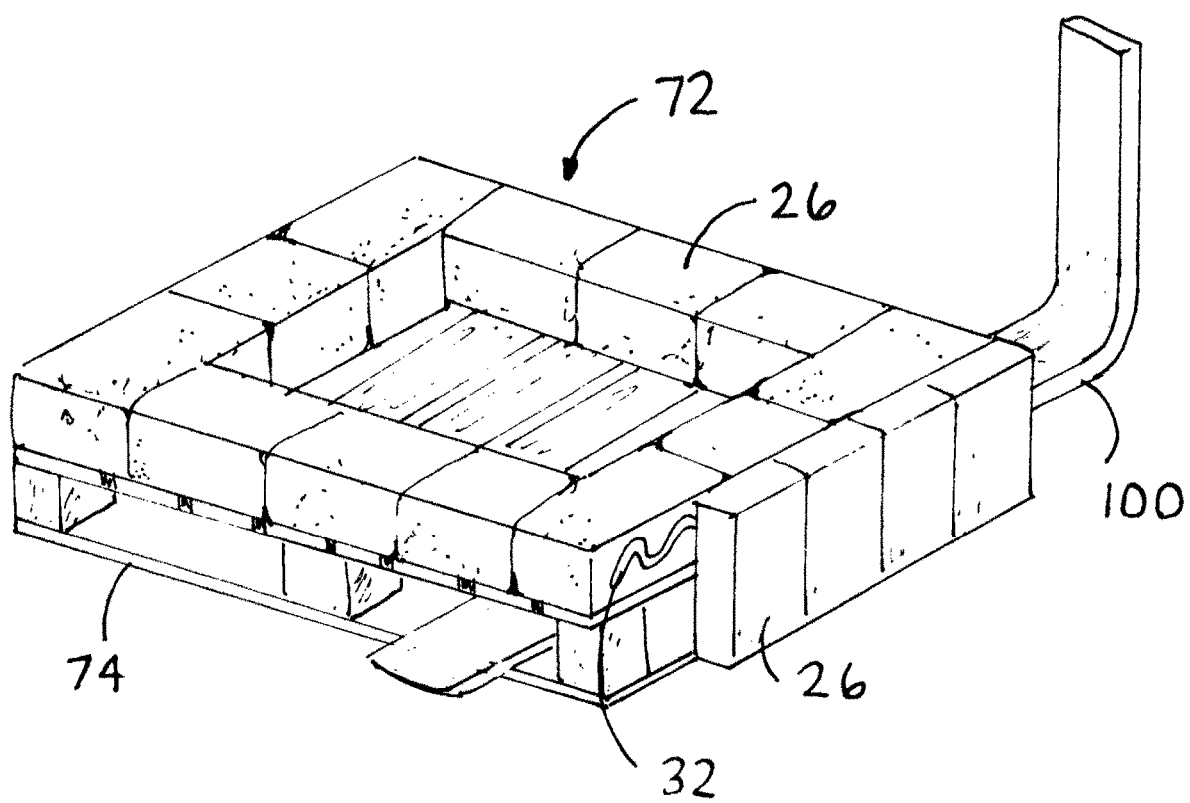
FIG. 6a is a perspective view of a base of an outdoor structure fabricated with a pallet in accordance with the present invention.
Figure 6B:
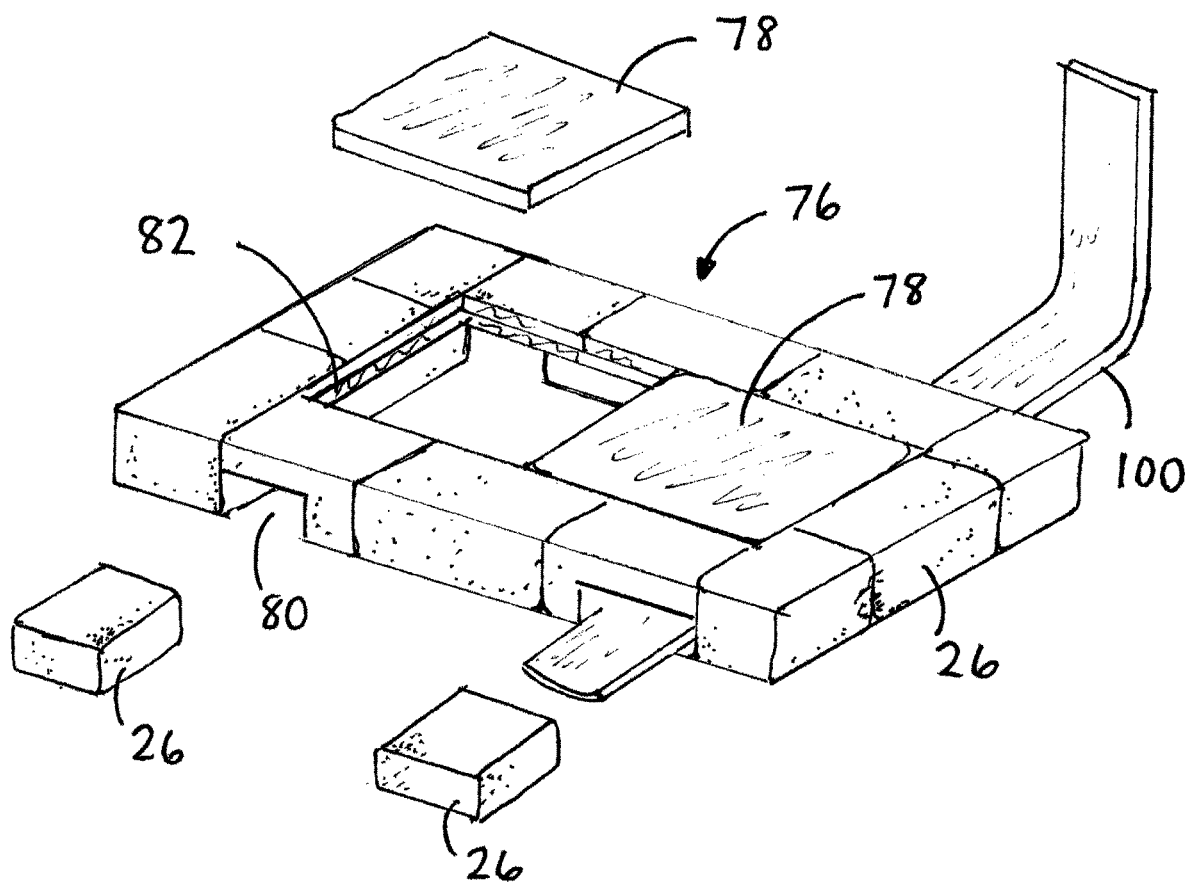
FIG. 6b is a perspective view of a base of an outdoor structure fabricated with pre-cast concrete plates and brick or block in accordance with the present invention.

With reference to FIG. 6a, a bottom of a brick or block outdoor structure 72 may be created by building thereof on top of a pallet 74. The plurality of brick or block 26 is attached to a top of the pallet 74 with adhesive 32 or the like. A bottom perimeter of the pallet 74 is covered by attaching the plurality of brick or block 26 with adhesive 32. With reference to FIG. 6b, a bottom of a brick or block outdoor structure 76 may be created using pre-cast concrete plates 78 and a plurality of brick or block 26. A perimeter ledge 82 is cut on an inside perimeter of a first row of brick or block 26 to receive the pre-cast concrete plates 78. The pre-cast concrete plates 78 are preferably attached to the brick or block 26 with adhesive 32. Two channels 80 are cut through two of the plurality of brick or block 26 to receive two lift forks 100.

Figure 7:
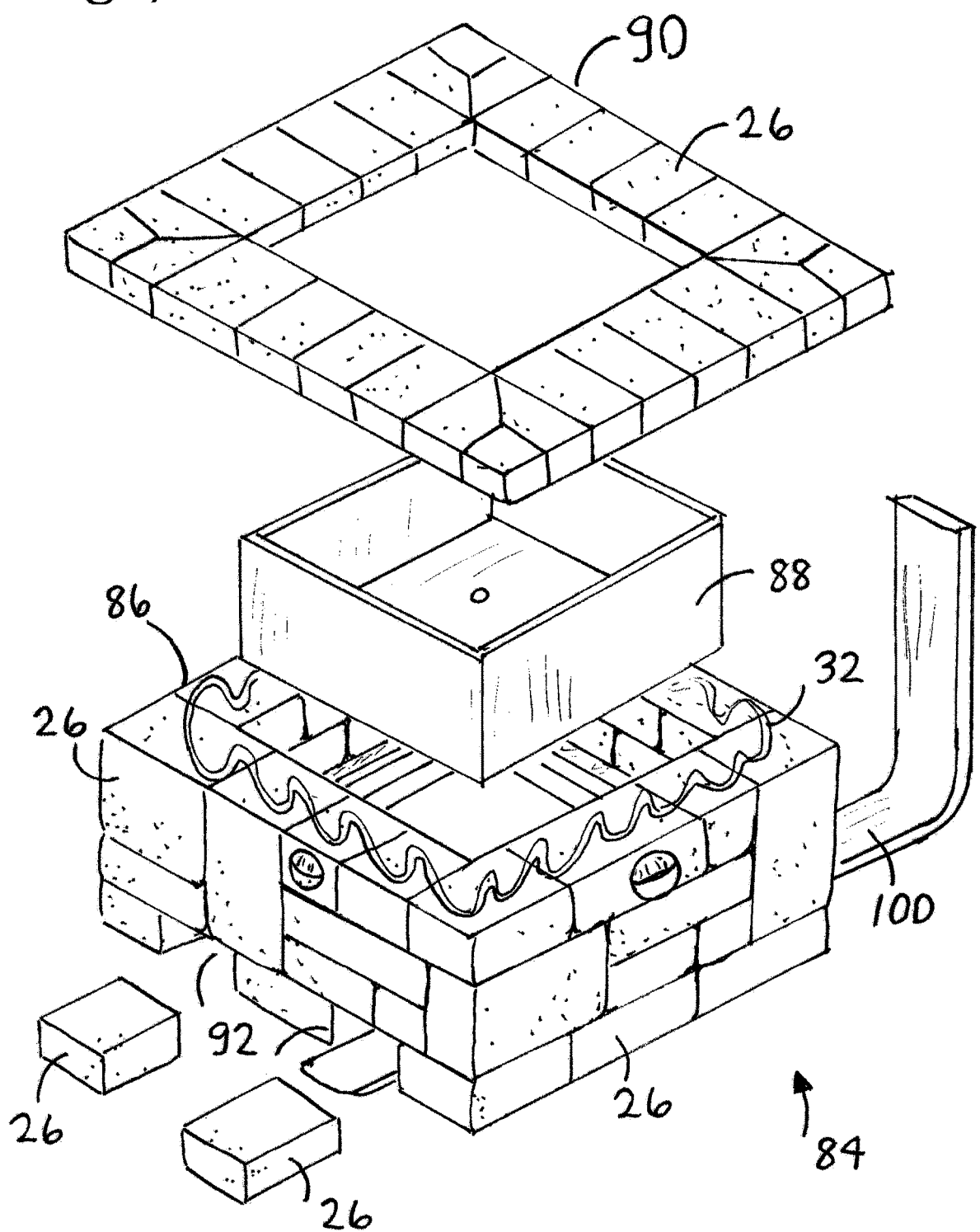
FIG. 7 is an exploded perspective view of an outdoor fire pit in accordance with the present invention.

With reference to FIG. 7, an outdoor fire pit 84 includes a pit enclosure 86, a fire pit liner 88 and a pit top 90. The pit enclosure 86 includes a plurality of brick or block 26 built around the fire pit liner 88. The fire pit liner 88 are well known in the art and may be purchased from numerous sources. Two channels 92 are formed in a bottom of the pit enclosure 86. The two channels 92 are sized to receive two lift forks 100. The two channels 92 are hidden by inserting two bricks or blocks 26. The pit top 90 is fabricated by attaching a plurality of brick or block 26 together with adhesive 32 or the like. The pit top 90 is attached to a top of the pit enclosure 86 with adhesive 32.

Figure 8:
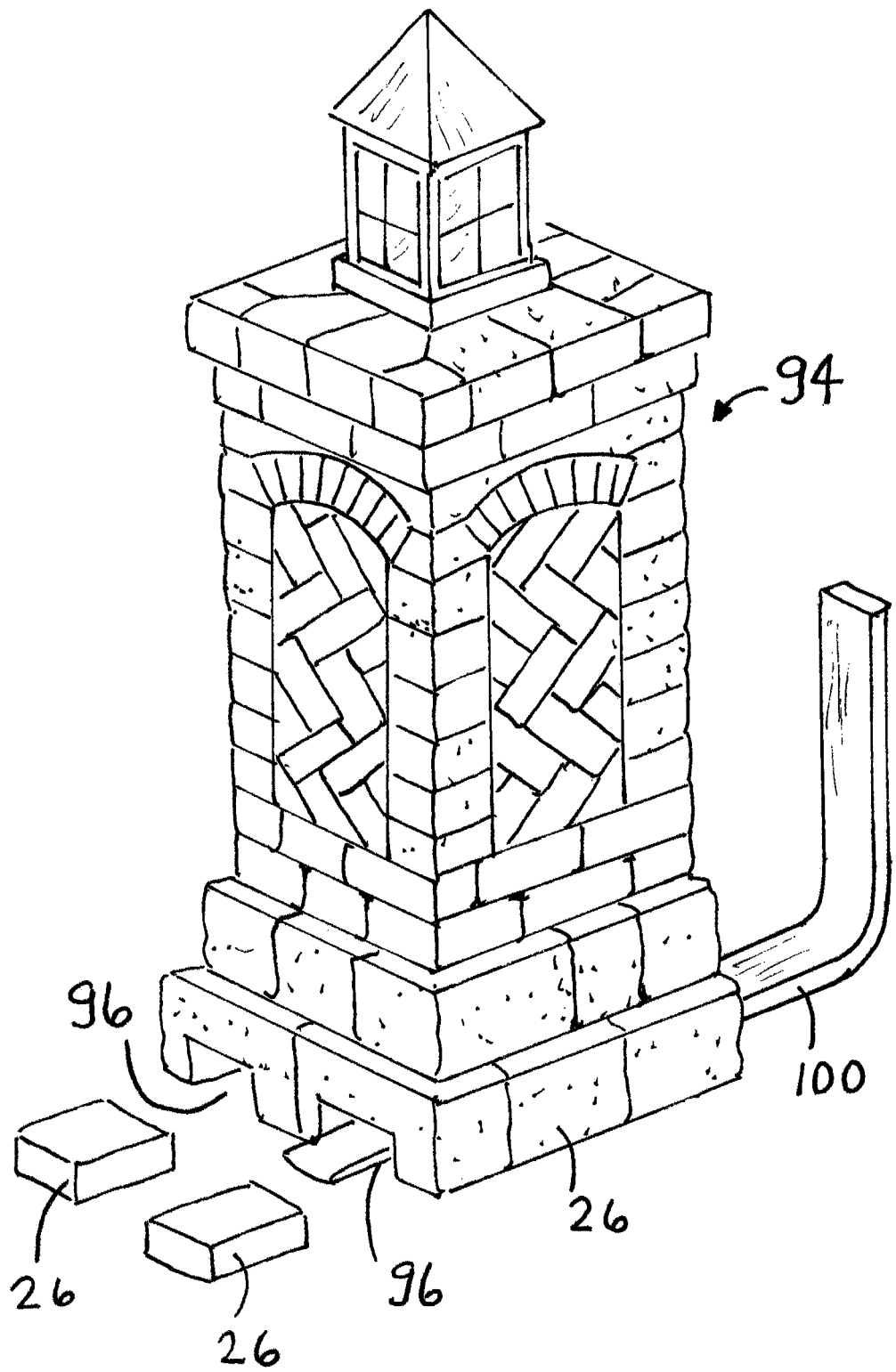
FIG. 8 is an perspective view of an outdoor pillar in accordance with the present invention.

With reference to FIG. 8, an outdoor pillar 94 includes a plurality of brick or block 26. Two channels 96 are cut in a bottom of the plurality of brick or block 26 to receive two lift forks 100. At least two brick or blocks 26 are inserted into the two channels 96 to hide thereof.

Figure 9:
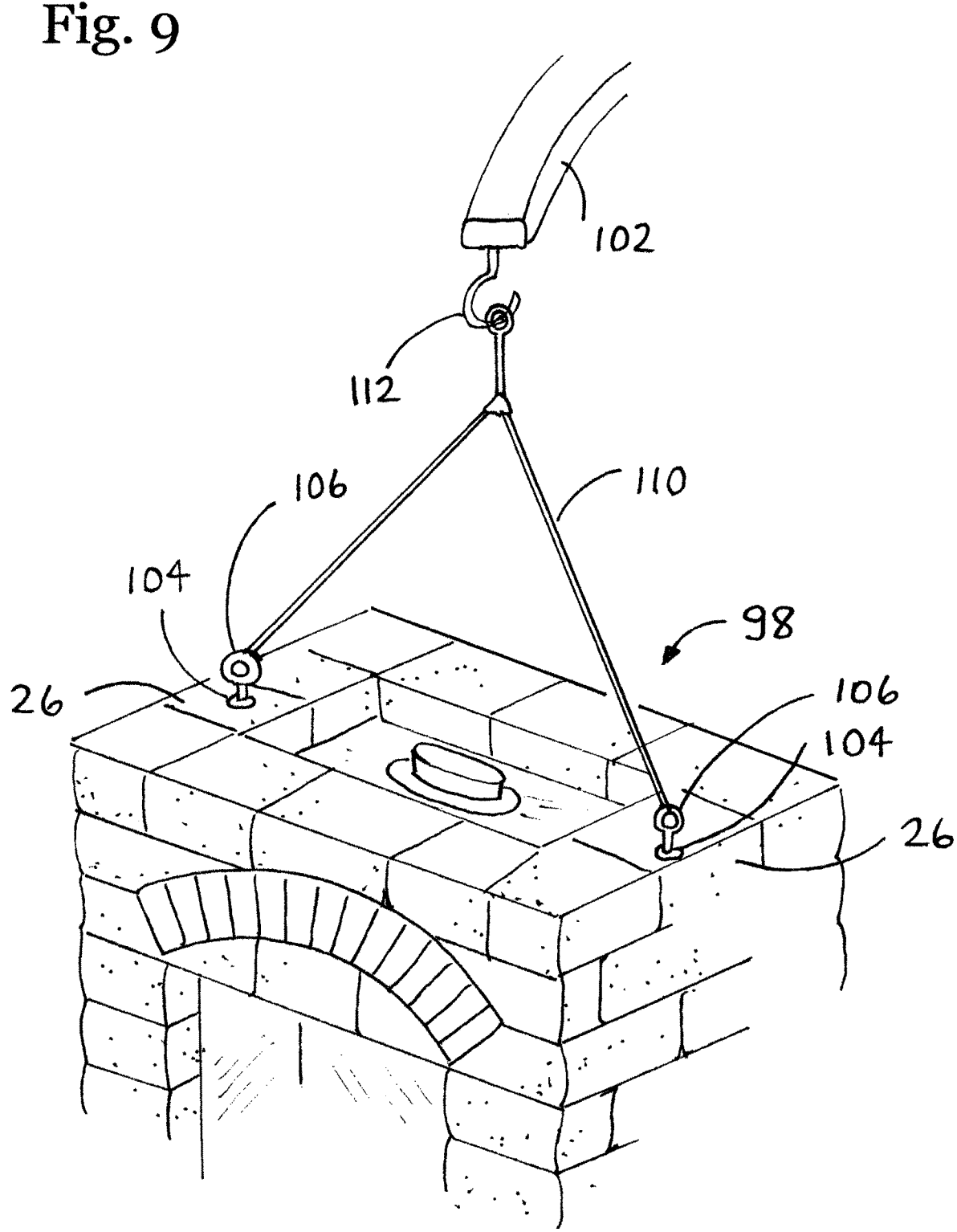
FIG. 9 is a perspective view of a pair of eye bolts used to lift a modular section of a fire place in accordance with the present invention.
Figure 10:
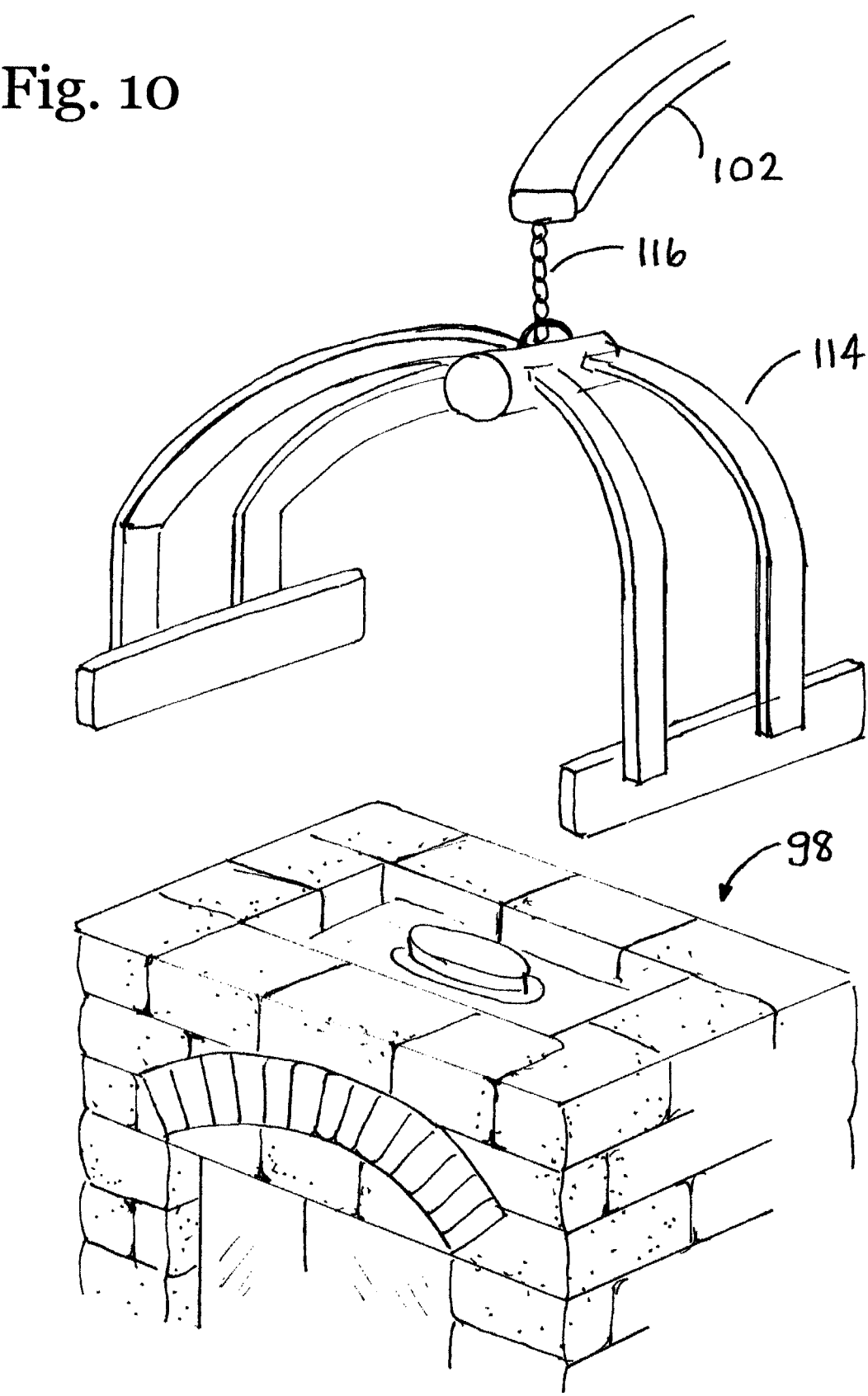
FIG. 10 is a perspective view of a friction lift unit for lifting a modular section of a fire place in accordance with the present invention.

With reference to FIG. 9, a brick or block outdoor structure 98 is lifted with a boom 102 of a crane. Two threaded taps 104 are formed in two brick or blocks 26. Two eye bolts 106 are threaded into the two threaded taps 104. The ends of a three wire sling 110 are attached to the two eye bolts 106 and a hook 112 extending from the boom 102. With reference to FIG. 10, a friction lift unit 114 is suspended from the boom 102 of a crane with a chain 116. The crane may be used to move a brick or block outdoor structure 98 instead of two lift forks 100.

Figure 11:
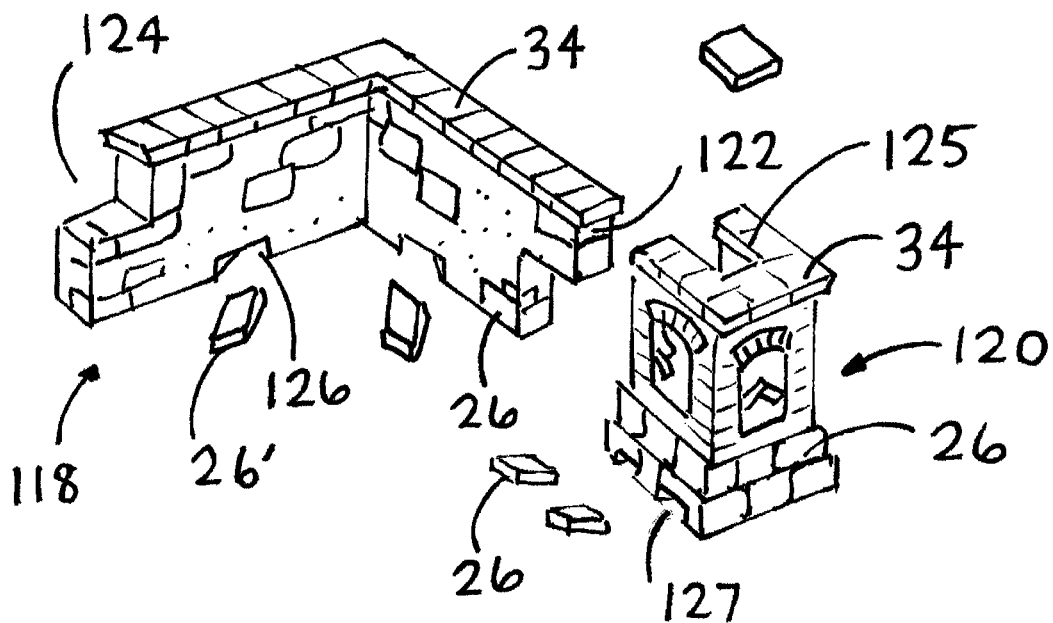
FIG. 11 is a perspective view of a modular brick or block wall corner connector and end pillar in accordance with the present invention.
Figure 12:
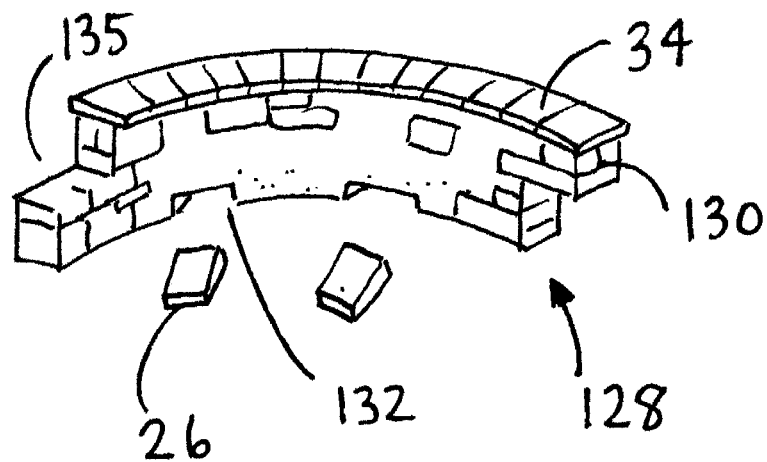
FIG. 12 is a perspective view of a modular brick or block curved wall corner connector in accordance with the present invention.
Figure 13:
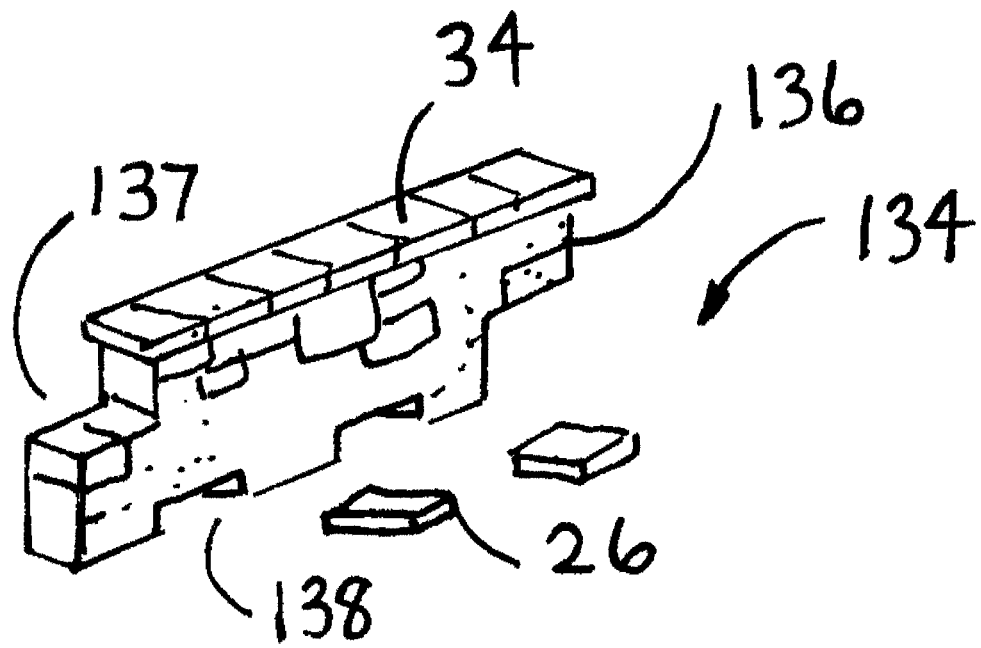
FIG. 13 is a perspective view of a modular brick or block wall section in accordance with the present invention.

With reference to FIGS. 11-13, components of a brick or block outdoor wall are shown. FIG. 11 illustrates a modular brick or block square wall corner connector (square corner connector) 118 and an end pillar 120. The square corner connector 118 is fabricated from a plurality of brick or block 26. A top portion of the square corner connector 118 is preferably topped with a plurality of brick 34. A engagement projection 122 preferably extends from one end of the square corner connector 118 and a projection notch 124 is formed in the other end thereof. The end pillar 120 includes a projection slot 125 that is sized to receive the engagement projection 122. A pair of channels 126 are formed in a bottom of the square corner connector 118 to receive two lift forks 100. Two bricks or blocks 26' are sized to be received by the pair of channels 126. The end pillar 120 is fabricated from a plurality of brick or block 26. A top of the end pillar 120 is preferably topped with a plurality of brick 34. A pair of channels 127 are formed in a bottom of the end pillar 120. Two bricks or blocks 26' are sized to be received by the pair of channels 127.

FIG. 12 illustrates a modular brick or block curved wall corner connector (curved corner connector) 128. The curved corner connector 128 is fabricated from a plurality of brick or block 26. A top portion of the curved corner connector 128 is preferably topped with a plurality of brick 34. A engagement projection 130 preferably extends from one end of the curved corner connector 128 and a projection notch 135 extends from the other end thereof. A pair of channels 132 are formed in a bottom of the square corner connector 128 to receive two lift forks 100. Two bricks or blocks 26' are sized to be received by the pair of channels 132.

FIG. 13 illustrates a modular brick or block wall section (wall section) 134. The wall section 134 is fabricated from a plurality of brick or block 26. A top portion of the wall section 134 is preferably topped with a plurality of brick 34. An engagement projection 136 preferably extends from one end of the wall section 134 and a projection notch 137 is formed in the other end thereof. A pair of channels 138 are formed in a bottom of the wall section 134 to receive two lift forks 100. Two bricks or blocks 26 are sized to be received by the pair of channels 138.

Figure 14:
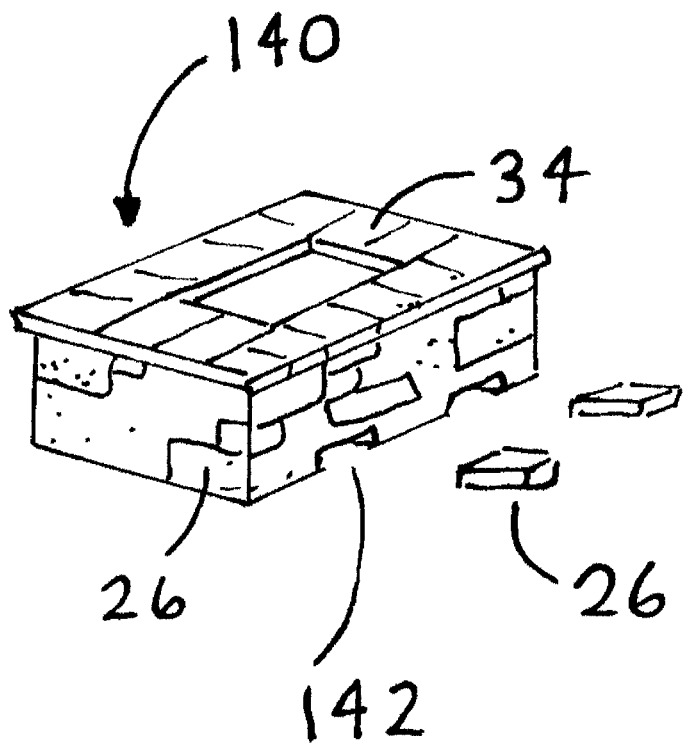
FIG. 14 is a perspective view of a brick or block planter in accordance with the present invention.

FIG. 14 illustrates a brick or block wall planter (planter) 140. The planter 140 is fabricated from a plurality of brick or block 26. A top portion of the planter 140 is preferably topped with a plurality of brick 34. A pair of channels 142 are formed in a bottom of the planter 140 to receive two lift forks 100. Two bricks or blocks 26 are sized to be received by the pair of channels 142.

Figure 15:
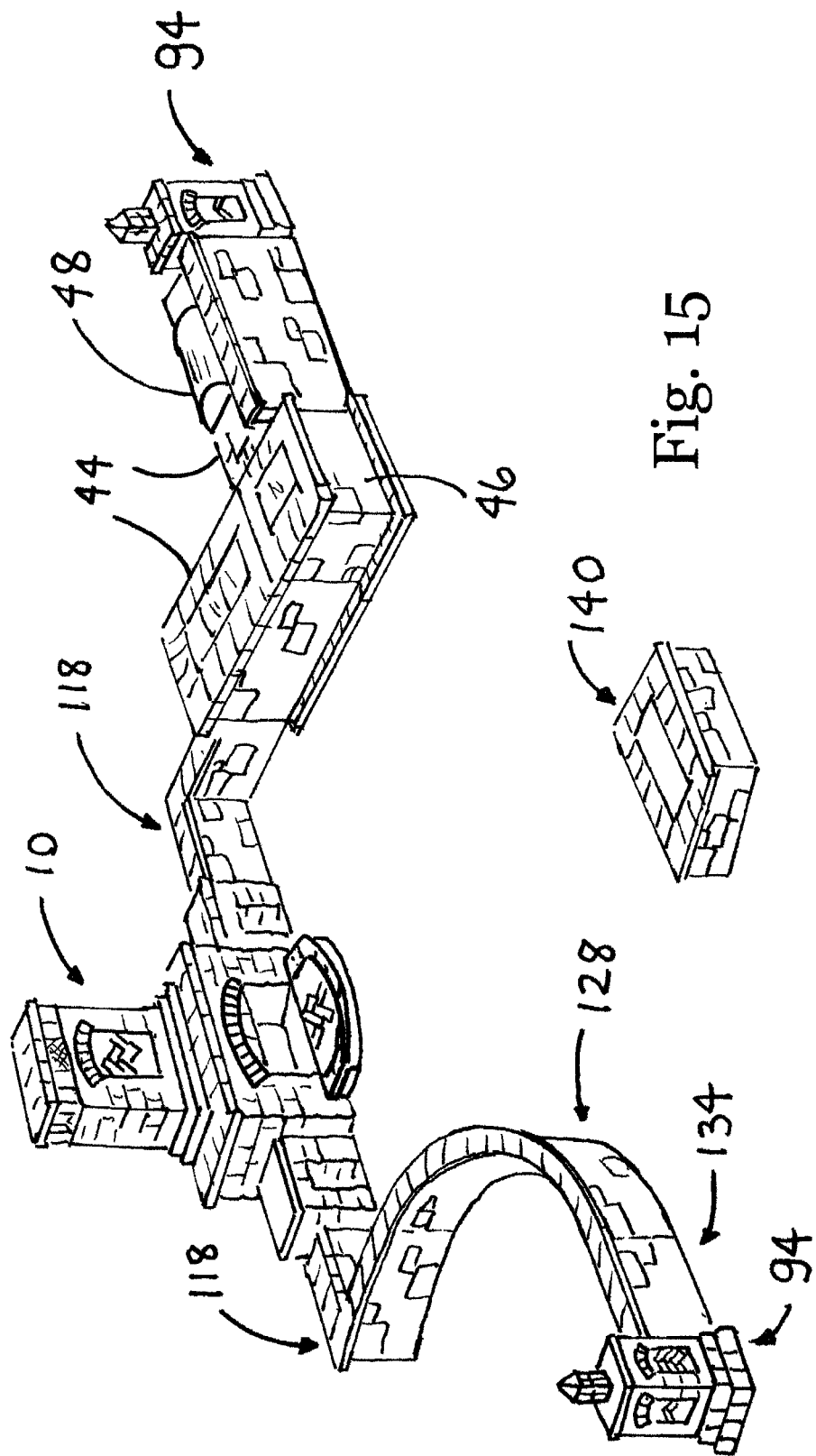
FIG. 15 is a perspective view of a patio having numerous modular brick or block outdoor structures in accordance with the present invention.

FIG. 15 illustrates a patio having numerous modular brick or block outdoor structures located adjacent to each other. A first pillar 94 is located adjacent one end of the wall section 134. The other end of the first wall section 134 is located adjacent one end of the curved corner connector 128. The other end of the curved corner connector 128 is located adjacent one end of a first square corner connector 118. The other end of the first square corner connector 118 is located adjacent a first end of the outdoor fireplace 10. The other end of the outdoor fireplace 10 is located adjacent to one end of a second square corner connector 118. The other end of the square corner connector 118 is located adjacent a first base unit 44. The first base unit 44 is located adjacent the corner unit 46. One end of a second base unit 44 is located adjacent the corner unit 46. The second base unit 44 includes a grill 48. The other end of the second base unit 44 is adjacent a second pillar 94. The planter 140 is also disclosed in FIG. 14.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A modular section comprising:
a plurality of bricks, a plurality of blocks, or a combination of a plurality of bricks and blocks;
adhesive securing the plurality of bricks, blocks, or combination thereof in a pre-assembled configuration of such bricks, blocks, or combination thereof, the pre-assembled configuration having a bottom portion;
two horizontal channels in the bottom portion spaced from one another and formed to receive forks of a forklift truck for transporting the pre-assembled configuration;
wherein the pre-assembled configuration is assembled at a first site to form the modular section having the two channels; and
a second plurality of bricks, blocks or a combination thereof is secured to the pre-assembled configuration at a second site to cosmetically hide the two channels from view.

2. The modular section of claim 1 wherein:
the two channels are cosmetically hidden by at least some of the second plurality of bricks, or blocks, or combination thereof extending into the channels.

3. The modular section of claim 1 wherein:
a first of the two channels has a single brick or block inserted therein, and a second of the two channels has a single brick or block inserted therein.

4. The modular section of claim 1 further comprising:
at least one or more additional modular sections, each having the pre-assembled configuration of bricks, blocks or combination thereof and bottom portion with two channels in the bottom portion spaced from one another and formed to receive the forks of a forklift truck.

5. The modular section of claim 1 wherein:
the pre-assembled configuration includes multiple bricks or blocks along a width, depth, and height.

6. A modular section comprising:
a plurality of bricks, a plurality of blocks, or a combination of a plurality of bricks and blocks secured in an assembled configuration using adhesive, the assembled configuration having a bottom portion and one or more horizontal channels formed within the bottom portion, and
wherein the one or more channels are large enough and deep enough to accommodate the forks of a forklift truck and are configured to be cosmetically hidden by at least one brick or block, one or more portions of a brick or block, or a combination thereof to hide the one or more channels from view following installation of the modular section; and at least one brick or block, one or more portions of a brick or block, or a combination thereof for cosmetically hiding the one or more channels.

7. The modular section of claim 6 comprising:
an outdoor fireplace base having a firebox and at least one or more additional modular sections, each having the assembled configuration of bricks, blocks or combination thereof and bottom portion with one or more channels in the bottom portion formed to accommodate the forks of a forklift truck.

8. The modular section of claim 7 wherein:
the at least one or more additional modular sections including one or more of: a hearth, a chimney, a decorative cap, and a wood box.

9. The modular section of claim 6 wherein the modular section is an outdoor fireplace base having a firebox and also includes a chimney.

10. A modular section comprising:
a plurality of bricks, a plurality of blocks, or a combination of a plurality of bricks and blocks;
the plurality of bricks, blocks, or combination thereof being secured together in a pre-assembled configuration with adhesive, the pre-assembled configuration including multiple bricks or blocks along a width, depth, and height, and the pre-assembled configuration having a bottom portion;
one or more horizontal channels in the bottom portion and formed to receive two lift forks of a forklift;
wherein the pre-assembled configuration is assembled at a first site to form the modular section having the one or more channels; and
an additional one or more bricks, blocks or a combination thereof positioned at a second site to cosmetically hide the one or more channels from view.

11. The modular section of claim 10 wherein:
the one or more channels comprises more than a single channel.

12. The modular section of claim 10 wherein:
the one or more channels comprises two channels spaced to receive forks of a forklift truck.

13. The modular section of claim 12 wherein:
the additional one or more bricks, or blocks, or combination thereof are sized and configured to extend into the channels.

14. The modular section of claim 10 wherein:
the one or more channels are cosmetically hidden by at least some of the additional bricks, or blocks, or combination thereof extending into the one or more channels.

* * * * *